United States Patent
Fairbanks

[15] 3,694,537
[45] Sept. 26, 1972

[54] MANUFACTURE OF WEBS HAVING SELECTED ORIENTED PORTIONS

[72] Inventor: Theodore H. Fairbanks, R.D. 1, Liverpool, Pa. 17045

[73] Assignee: FMC Corporation, Philadelphia, Pa.

[22] Filed: Sept. 18, 1970

[21] Appl. No.: 73,435

Related U.S. Application Data

[63] Continuation-in-part of Ser. No. 784,383, Dec. 17, 1968, Pat. No. 3,632,716.

[52] U.S. Cl..............264/145, 264/154, 264/210 R, 264/237, 264/289, 264/348, 264/DIG. 47
[51] Int. Cl.........B29c 25/00, B29d 7/22, B29d 7/24
[58] Field of Search......264/167, 147, 177, 145, 348, 264/154, 210 R, 289, 237, DIG. 47

[56] References Cited

UNITED STATES PATENTS

| | | | |
|---|---|---|---|
| 3,137,746 | 6/1964 | Seymour et al. | 264/289 |
| 3,423,274 | 1/1969 | Lahm et al. | 264/348 |
| 3,386,876 | 6/1968 | Wyckoff | 264/289 |
| 3,255,065 | 6/1966 | Wyckoff | 264/289 |
| 3,500,627 | 3/1970 | Kim | 264/DIG. 47 |
| 2,952,878 | 9/1960 | Swerlick et al. | 264/289 |

Primary Examiner—Robert F. White
Assistant Examiner—Jeffery R. Thurlow
Attorney—Thomas R. O'Malley, George F. Mueller and Eugene G. Horsky

[57] ABSTRACT

Manufacture of a thermoplastic polymeric web or film having a predetermined pattern of molecularly oriented portions by completely cooling an extruded flat unbroken steam of molten orientable crystallizable, thermoplastic polymeric material to provide an integral web, with selected spaced areas of such stream being cooled more slowly than the regions adjacent thereto, and thereafter stretching the web along biaxial directions.

5 Claims, 5 Drawing Figures

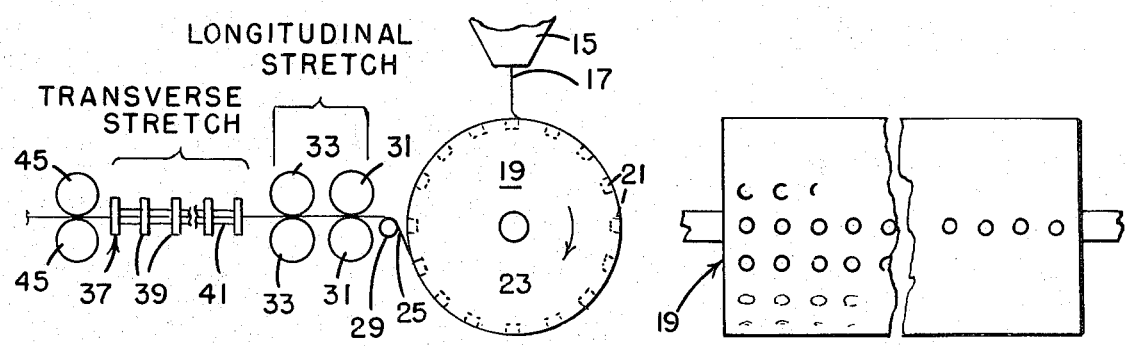
Fig. 1
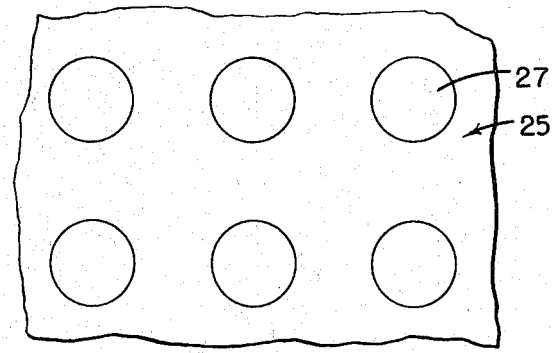
Fig. 2
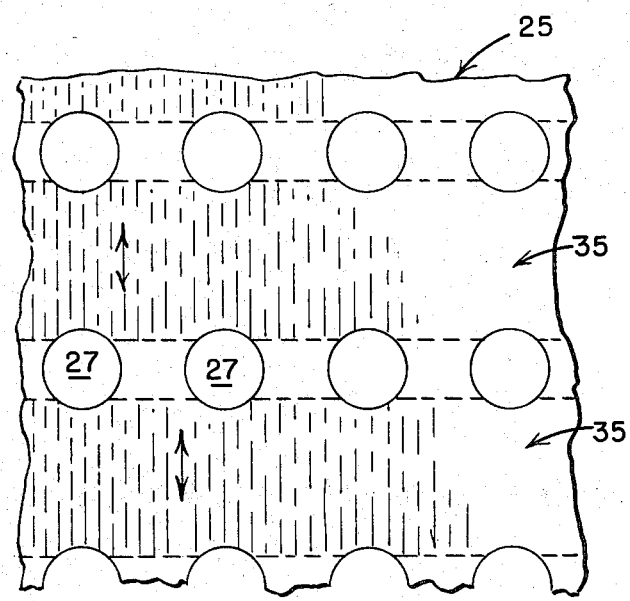
Fig. 3
Fig. 4
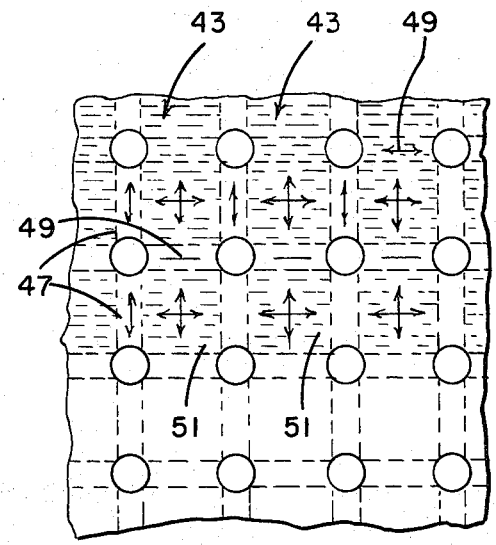
Fig. 5

MANUFACTURE OF WEBS HAVING SELECTED ORIENTED PORTIONS

This application is a continuation-in-part of my application Ser. No. 784,383, filed Dec. 17, 1968, now U.S. Pat. No. 3,632,716.

The present invention is directed to an improved method for making films or webs from thermoplastic polymeric materials which possess high strength, stiffness and tear resistant properties.

U.S. Pat. No. 3,255,065, issued on June 7, 1966, to H. W. Wyckoff, discloses a method and apparatus for making a composite film by laminating, or otherwise uniting, an unbroken and unoriented web of thermoplastic polymeric material with a similar web having a series of openings or perforations disposed in a predetermined pattern, followed by a stretching of the laminated structure along desired directions.

Upon stretching of such laminated structure along its longitudinal and transverse axes, the portions of the unbroken web which extend across the openings in the perforated web are biaxially oriented. The ribs of the perforated web, and the portions of the unbroken web attached thereto, are uniaxially oriented and impart desired stiffness into the resulting composite film, while the areas of the laminated structure which are located between the ends of such ribs remain undrawn.

As more fully described in the above-noted patent, the relationship between the spacing and size and/or shape of the openings in the perforated web is of critical importance from the standpoint of isolating the effects of the stretching forces to the ribs themselves so that undrawn junctions remain between the uniaxially drawn ribs.

The manufacture of composite films by the method described in the above-noted patent requires the production of separate unoriented webs of thermoplastic polymeric material, the perforating of one of such webs, the laminating of the unperforated and perforated webs, and finally the biaxial stretching of the laminated structure. These numerous manipulative steps, taken with the critical care which must be exercised to insure proper web perforation and lamination render the above-described patented method slow and costly.

A primary object of this invention is to provide a new or generally improved and more satisfactory method for making a thermoplastic polymeric web or film having good strength and stiffness along its selected directions and which exhibits improved tear resistant characteristics.

Another object is the provision of a method for providing a web of thermoplastic polymeric material of generally uniform thickness with a predetermined pattern of molecularly oriented portions.

Still another object of this invention is a method which is adapted for rapid and economical manufacture of thermoplastic polymeric webs or films having a predetermined pattern of molecularly oriented portions.

A further object is the provision of a method for making a thermoplastic polymeric film having fabric-like properties along selected portions thereof.

For a greater understanding of this invention, reference is made to the following detailed description and drawing in which FIG. 1 is a diagrammatic view of apparatus employed in the method of the present invention;

FIG. 2 is a front view of a chill roller employed in the apparatus shown in FIG. 1;

FIG. 3 is a plan view of a portion of a thermoplastic polymeric web produced on the chill roller shown in FIGS. 1 and 2;

FIG. 4 is a plan view illustrating the web of FIG. 3 after it has been stretched along one of its axial directions; and FIG. 5 is a plan view illustrating the web shown in FIG. 4, on a smaller scale, after it has been stretched along another of its biaxial directions.

The above and other objects of the invention are achieved by a method in which an extruded flat and unbroken stream of molten thermoplastic polymeric material is cooled to provide an integral web, with selected, independent and substantially like areas, aligned longitudinally and transversely of the extruded stream and equally spaced in their respective directions, being cooled at a slower rate than the regions which are adjacent thereto. The regions of the extruded stream which are adjacent to the selected areas thereof are cooled at a rate as to at least minimize and preferably prevent crystal formation therein. Once cooled, the web is stretched along biaxial directions whereby the regions between adjacent transversely aligned selected areas are uniaxially oriented in a direction transversely of the web, while the regions between adjacent longitudinally aligned selected areas are also uniaxially oriented but in a direction longitudinally of the web. The selected areas of the web remain substantially undrawn while the remaining regions of the web are biaxially oriented.

The method of the present invention is adapted for use with orientable, crystallizable thermoplastic polymeric materials. As described above, the extruded stream of molten thermoplastic polymeric material is completely cooled after its extrusion and before stretching, with the selected areas thereof being cooled at a slower rate than the regions which are adjacent thereto. Crystallization accompanies this slower cooling in the selected areas of the web and thus such selected areas undergo no apparent or significant drawing during the subsequent stretching stage.

In the practice of the method of the present invention, the web may be stretched along biaxial directions in independent steps or simultaneously. The degree to which the web is stretched in either of its biaxial directions may be varied and is preferably such as to orient all regions between the transversely and longitudinally aligned selected areas of the web. Fabric-like characteristics may be imparted to the resulting product by exerting such stretching as to cause fibrillation of the biaxially oriented regions thereof. Heat may be applied to the web which is being stretched prior to and/or during the actual stretching step to encourage the drawing thereof.

In general, the apparatus employed in the method of the present invention includes means for extruding a continuous, flat and unbroken stream of molten thermoplastic polymeric material, a patterned chill member positioned to receive upon its surface the flat stream of molten thermoplastic material as it issues from the extruding means for cooling the same into an integral web, means for moving the chill member relative to the extruding means, and means for stretching the web along biaxial directions. The chill member is preferably a roller having a patterned peripheral surface in which selected surface areas thereof are defined by like, spaced depressions. Preferably, these depressions are of circular and concave configuration.

The method of the present invention is adapted for use in making films from all crystallizable thermoplastic materials, the molecules of which may be oriented by stretching. The particular polymeric material employed will, in general, depend upon the intended use of the resulting product. The products made in accordance with the teachings of the present invention are suited for a variety of uses in which either the non-porous or the fabric-like properties of the product are of particular importance and where high strength, stiffness and tear resistance are desired characteristics. For example, webs made by the present invention may be used as protective coverings or shields as in building construction, as article wrapping or bagging materials, as inflatable structures, such as observation balloons, life rafts, etc.

For a more detailed description of the method of the present invention, reference is made to FIG. 1 of the drawing wherein character 15 denotes a portion of a die or nozzle, which is part of a conventional extrusion system, from which a flat unbroken stream 17 of molten thermoplastic polymeric material, such as polyethylene terephthalate is extruded. This extruded stream 17 of molten thermoplastic polymeric material is received upon a chill roller 19 which, as shown in FIG. 2, is formed with depressions 21 in its peripheral surface. These depressions 21 are of substantially like circular and concave configuration, and are aligned longitudinally and circumferentially of the roller surface and are equally spaced along their respective longitudinal and circumferential directions. Suitable means, not shown, is provided for continuously driving the roller 19 in the direction as indicated by arrow 23. The roller 19 is cooled by circulating a chilled liquid therethrough or by any other known and conventional manner.

The stream 17 of molten thermoplastic material extruded from the nozzle 15 is received upon the chill roller 19 where it spans the depressions 21 while making snug contact with the remaining portions of the chill roller surface. While engaged and traveling with the chill roller 19 the stream 17 is quenched to provide an integral web 25.

During quenching, the areas of the stream 17 overlying the chill roller depressions 21 are, of course, cooled at a slower rate than the regions adjacent thereto which are in direct and snug contact with the surface of the roller 19. As a result, crystallization takes place in these slower cooling areas of the stream 17 during its quenching and, in the web 25, such areas have been identified at 27.

The rate of cooling and thus the degree of crystallinity which occurs in the selected areas 27 of the web 25, will depend upon such factors as the temperatures of the chill roller 19, the ambient atmosphere and extruded molten thermoplastic material and the size, depth and spacing of the chill roll depressions or indentations 21, and thus can be varied to provide for desired properties in the finished product. The web 25 is preferably completely cooled on the chill roller 19.

The web 25 is removed from the surface of the chill roller 19 by a stripping roll 29 and is passed in-between pairs of conventional driven nip rolls 31 and 33. The nip rolls 33 are driven at a more rapid rate than the nip rolls 31 whereby sections 35, which extend transversely of the web at longitudinally spaced intervals thereof, are stretched longitudinally to orient the molecules thereof, as indicated by shading in FIG. 4. The crystallization which has occurred in the areas 27 prevent these areas as well as the regions extending transversely between adjacent of such areas, from yielding under the longitudinal stretching forces.

Once beyond the nip rolls 33, the web 25 is passed into a conventional tenter frame 37 where its longitudinal edges are gripped at spaced intervals by clips 39 carried by endless belts 41. From the nip rolls 33, the belts 41 of the tenter frame 37 are directed along diverging paths. Thus, during movement with the tenter frame belts 41 sections 43 of the web 25, which extend longitudinally of the web at transversely spaced intervals thereof, are stretched to orient the molecules thereof as indicated by shading in FIG. 5. As during the longitudinal stretching of the web 25, the crystalline areas 27 do not yield during this stretching stage and thus prevent transverse drawing of the regions of the web located between the adjacent longitudinally aligned areas 27.

The web 25 may be heated to a desired orientation temperature range during the stretching thereof and, once stretched, the web 25 is released from the tenter frame, cooled if necessary, and advanced by nip rolls 45 to a suitable collection means, not shown.

In the resulting web product, as shown in FIG. 5, the selected areas 27 are, of course, undrawn, while ribs 47 between longitudinally aligned areas 27 and ribs 49 between transversely aligned areas 27 have been uniaxially stretched and thus oriented in the directions as indicated by double-headed arrows in the respective ribs. The remaining regions 51 of the web 25 have been subjected to both longitudinal and transverse stretching forces, as indicated by crossing arrows, and thus the molecules thereof have been biaxially oriented.

The uniaxially oriented webs 47 and 49 impart stiffness into the web 25 in the respective directions of such ribs and, together with the biaxially oriented regions 51, improve the web tensile strength properties. The unoriented areas 27 are well isolated from each other by the surrounding oriented ribs 47 and 49 and serve well in arresting any tearing which may initiate at other regions of the web.

While the size, shape and/or configuration of these selected unoriented areas 27 formed in the unoriented web 25 may be varied to provide in the resulting stretched product desired stiffness and/or strength characteristics, such areas 27 must be of substantially like size, aligned longitudinally and transversely of the web, and equally spaced in their respective longitudinal and transverse directions.

I claim:

1. A method of making a web of polymeric material having a predetermined pattern of molecularly oriented portions including the steps of extruding a flat, unbroken molten stream of orientable, crystallizable, thermoplastic polymeric material, completely cooling the extruded stream of molten thermoplastic material to provide an integral web with selected, independent and substantially like areas aligned longitudinally and transversely of the extruded stream and equally spaced from each other in their respective directions, being cooled at a slower rate than the regions adjacent thereto to thereby impart a higher degree of crystallinity to such selected areas, and stretching the web along biaxial directions to cause regions of the web between adjacent transversely aligned selected areas to be uniaxially oriented in a direction transversely of the web, regions of the web between adjacent longitudinally aligned selected areas to be uniaxially oriented in a direction longitudinally of the web, the selected areas themselves to be substantially undrawn and the remaining regions of the web to be biaxially oriented.

2. A method as defined in claim 1 wherein the regions of the extruded stream of polymeric material which are adjacent to the selected areas thereof are cooled at a rate as to at least minimize crystallization thereof.

3. A method as defined in claim 2 wherein the regions of the extruded stream of polymeric material which are adjacent to the selected areas thereof are cooled at a rate as to prevent crystal formation thereon.

4. A method as defined in claim 1 wherein the web is stretched to produce fibrillation along the biaxially oriented regions thereof.

5. A method as defined in claim 1 wherein the web is stretched simultaneously along biaxial directions.

* * * * *